(12) United States Patent
Ortiz (10) Patent No.: US 8,160,647 B2
(45) Date of Patent: Apr. 17, 2012

(54) FILTER SYSTEM FOR USE IN CO-SITE AND CONTROL METHOD THEREOF

(75) Inventor: Francisco Ortiz, Carrollton, TX (US)

(73) Assignee: Nokia Siemens Networks Oy, Espoo (FI)

(*) Notice: Subject to any disclaimer, the term of this patent is extended or adjusted under 35 U.S.C. 154(b) by 460 days.

(21) Appl. No.: 12/433,984

(22) Filed: May 1, 2009

(65) Prior Publication Data

US 2010/0279730 A1    Nov. 4, 2010

(51) Int. Cl.
*H04M 1/00* (2006.01)
(52) U.S. Cl. .................................. 455/562.1; 455/561
(58) Field of Classification Search ............... 455/554.2, 455/561, 562.1
See application file for complete search history.

(56) References Cited

U.S. PATENT DOCUMENTS

| | | | |
|---|---|---|---|
| 6,466,768 B1 * | 10/2002 | Agahi-Kesheh et al. | 455/78 |
| 7,890,078 B2 * | 2/2011 | Kluge et al. | 455/323 |
| 7,907,676 B2 * | 3/2011 | Stojanovic et al. | 375/260 |
| 7,953,383 B2 * | 5/2011 | Cho et al. | 455/260 |

* cited by examiner

*Primary Examiner* — Brian Young
(74) *Attorney, Agent, or Firm* — Staas & Halsey LLP (57) ABSTRACT

A co-site including at least two antenna/base transceiver station pairs operating on different frequency bands has a filter system that includes a first filter including a low band control port, a high band control port, a low band diversity port, and a high band diversity port and a second filter including a low band control port, a high band control port, a low band diversity port, and a high band diversity port. The second filter adjusts an adjustable load on each of the low band control port, the high band control port, the low band diversity port, and the high band diversity port of the second filter to simulate a current consumption of the low band control port, the high band control port, the low band diversity port, and the high band diversity port of the first filter, respectively.

10 Claims, 6 Drawing Sheets

|  | C1 | C2 | D1 | D2 |
|---|---|---|---|---|
| FREQ START MHz | 698 | 1710 | 698 | 1710 |
| FREQ STOP MHz | 960 | 2170 | 960 | 2170 |
| PORT AISG | 2.176 / 7.68 / No | 2.176 / 7.68 / No | 7.68 / No | 7.68 / No |
| PORT AISG SPEED | | | | |
| PORT LOAD | Yes/No/Short/Fault | Yes/No/Short/Fault | Yes/No/Short/Fault | Yes/No/Short/Fault |
| PORT DC | On / Off | On / Off | On / Off | On / Off |
| PORT CURRENT mA | | | | |

|  | F1 | F2 |
|---|---|---|
| FREQ START MHz | 698 | 698 |
| FREQ STOP MHz | 2170 | 2170 |
| PORT AISG | Yes | N/A |

|  | M1 | M2 |  |
|---|---|---|---|
| FREQ START MHz | 698 | 698 | |
| FREQ STOP MHz | 2170 | 2170 | |
| PORT AISG | Yes | N/A | |
| PORT Voltage | 15 | N/A | |
| PORT DC | On / Off | N/A | |
| PORT CURRENT mA | | N/A | |
| Allow all AISG devices read through M1 | | On / Off | note 3 |

|  | A1 | A2 | B1 | B2 |
|---|---|---|---|---|
| FREQ START MHz | 698 | 1710 | 698 | 1710 |
| FREQ STOP MHz | 960 | 2170 | 960 | 2170 |
| PORT AISG | 2.176 / 7.68 / No | 2.176 / 7.68 / No | 7.68 / No | 7.68 / No |
| PORT INPUT DC | | | | |
| PORT CURRENT | | | | |

Fig. 6

| | 700 MHz GSM Flexi BTS | 700 MHz WCDMA BTS | 700 MHz other vendor | 850 MHz GSM Flexi BTS | 850 MHz WCDMA BTS | 850 MHz other vendor | 900 MHz GSM Flexi BTS | 900 MHz WCDMA BTS | 900 MHz other vendor |
|---|---|---|---|---|---|---|---|---|---|
| 1700/ 2100 MHz WCDMA BTS | YES | YES | YES | YES | YES | YES | YES | YES | YES |
| 1700/ 2100 MHz GSM Flexi BTS | YES | YES | YES | YES | YES | YES | YES | YES | YES |
| 1700/ 2100 MHz other vendor | YES | YES | NO | YES | YES | NO | YES | YES | NO |
| 1800 MHz WCDMA BTS | YES | YES | YES | YES | YES | YES | YES | YES | YES |
| 1800 MHz GSM Flexi BTS | YES | YES | NO | YES | YES | NO | YES | YES | YES |
| 1800 MHz other vendor | YES | YES | YES | YES | YES | YES | YES | YES | NO |
| 1900 MHz WCDMA BTS | YES | YES | YES | YES | YES | YES | YES | YES | YES |
| 1900 MHz GSM Flexi BTS | YES | YES | NO | YES | YES | NO | YES | YES | YES |
| 1900 MHz other vendor | YES | YES | YES | YES | YES | YES | YES | YES | NO |
| 2100 MHz WCDMA BTS | YES | YES | NO | YES | YES | NO | YES | YES | YES |
| 2100 MHz other vendor | YES | YES | NO | YES | YES | NO | YES | YES | NO |

FILTER SYSTEM FOR USE IN CO-SITE AND CONTROL METHOD THEREOF

BACKGROUND OF THE INVENTION

Description of the Related Art

As telecommunication systems become more complex and more antennas are placed on the same structure the problem of interference becomes significant for the performance of the systems. This is especially true for co-sites, in which antennas for telecommunication systems that operate using different frequency bands are placed at the same site. Interference can corrupt the signals with noise and deteriorate the quality of the communications. In addition, it can cause jamming of the systems, followed by complete interruption of already established communications. Co-site equipment is required to minimize the impact of tower loading and cost from extra cables. However, as described in more detail below with reference to the drawings, known co-site designs can be costly and heavy due to the number of pieces of equipment used.

SUMMARY OF THE INVENTION

Various embodiments of the present invention provide a filter system for use in a co-site including at least two antenna/base transceiver station pairs operating on different frequency bands. The filter system includes first and second filters, each including low and high band control ports and low and high band diversity ports. The second filter adjusts an adjustable load on each of the low and high band control ports and low and high band diversity ports of the second filter to simulate current consumption of the low and high band control ports and low and high band diversity ports of the first filter, respectively.

Various embodiments of the present invention provide a control method for a filter system used in a co-site that includes at least two antenna/base transceiver station pairs operating on different frequency bands, the filter system including first and second filters, each including low and high band control ports and low and high band diversity ports. The control method includes measuring a current consumption at each of the low and high band control ports and the low and high band diversity ports of the first filter, outputting the measured current consumption at each of the low and high band control ports and the low and high band diversity ports of the first filter to the low and high band control ports and the low and high band diversity ports of the second filter, respectively, and adjusting an adjustable load on each of the low and high band control ports and the low and high band diversity ports of the second filter to simulate the respective measured current consumptions.

The above embodiments of the present invention are simply examples, and all embodiments of the present invention are not limited to these examples.

Additional advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
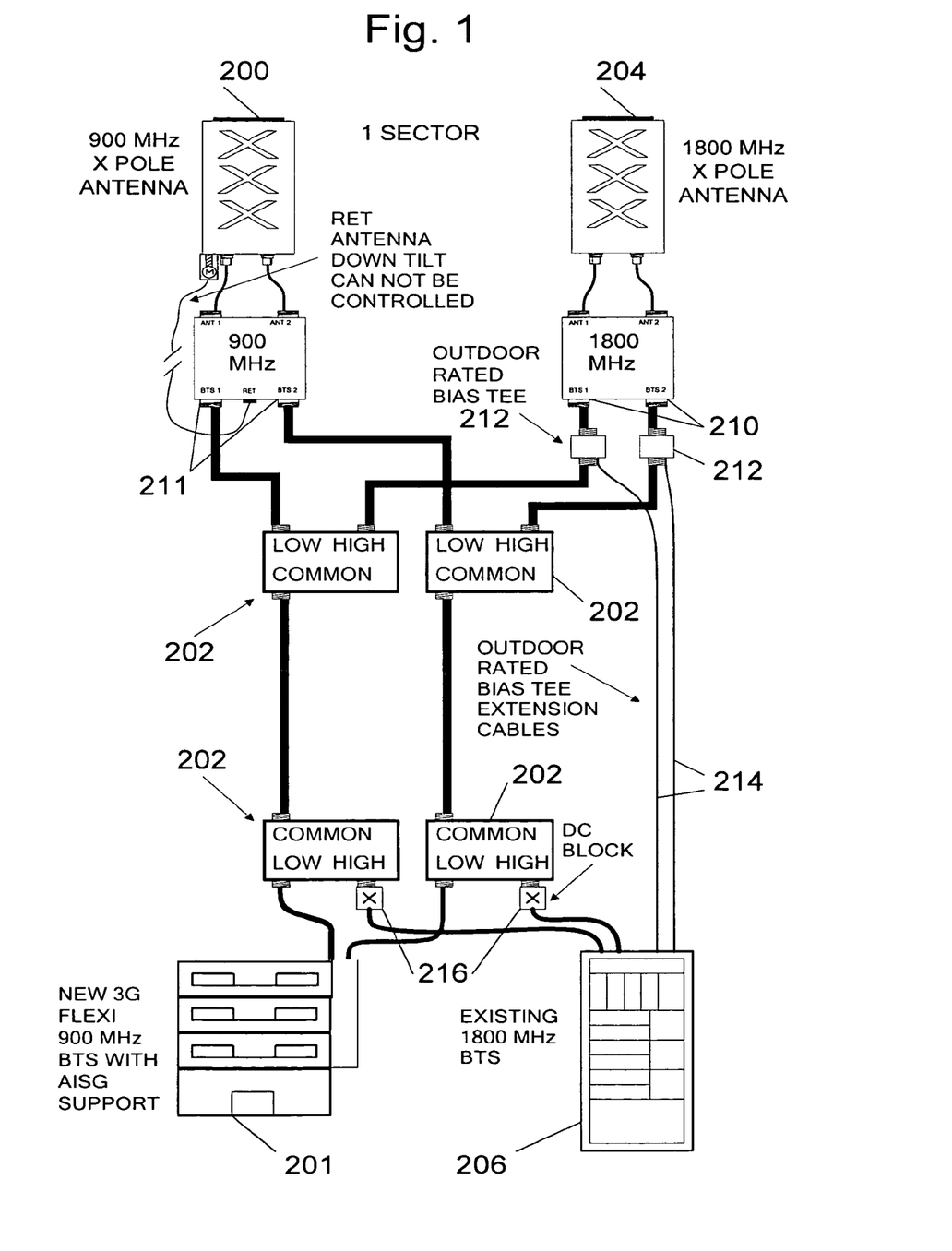
FIG. 1 is a block diagram of a prior art example of a co-site including two antenna/base transceiver station pairs operating on different frequency bands.

FIG. 1 of the drawings illustrates the existing solution for a co-site that uses two different types of equipment for two systems using different frequency bands for communication. Within the same sector of a co-site, there is a first antenna 200 that corresponds to first base transceiver station (BTS) 201 and a second antenna 204 that corresponds to a second BTS 206. The first antenna 200 is connected to the remainder of the system through a pair of masthead amplifiers (MHAs) 211 and a series of single filters 202. The second antenna 204 is connected to the remainder of the system through a pair of Wideband Code Division Multiple Access (WCDMA) masthead amplifiers (MHAs) 210 and the single filters 202. The MHAs may also be referred to as Tower Mounted Amplifiers (TMAs) and are RF bidirectional devices that amplify the signal level of the receiving band in the uplink direction. These MHAs can be powered by DC voltage and can be supplied by the BTS that travels along one of the RF cables. As an example, the first MHAs 211 may be a Global System for Mobile communications (GSM) 900 MHz with a 900 MHz X pole antenna attached and the first BTS 201 may be a 900 MHz base station. Furthermore, the second MHAs 210 may be a Global System for Mobile communications (GSM) 1800 MHz with an 1800 MHz X pole antenna attached and the second BTS 206 may be an 1800 MHz base station.

However, in the example of FIG. 1, the second BTS 206 requires two bias tees 212 to be mounted on top of the tower. These bias tees 212 have a disadvantage in that they increase the overall weight of the tower, increase the installation cost of the tower, and increase the number of possible failure points for the tower. Furthermore, the two bias tees require direct current (DC) and alarm cables 214, which also increase the overall weight of the tower, increase the installation cost of the tower, and increase the number of possible failure points for the tower. Also, two DC blocks are 216 are required, which adds a further installation cost.

Figure 2:
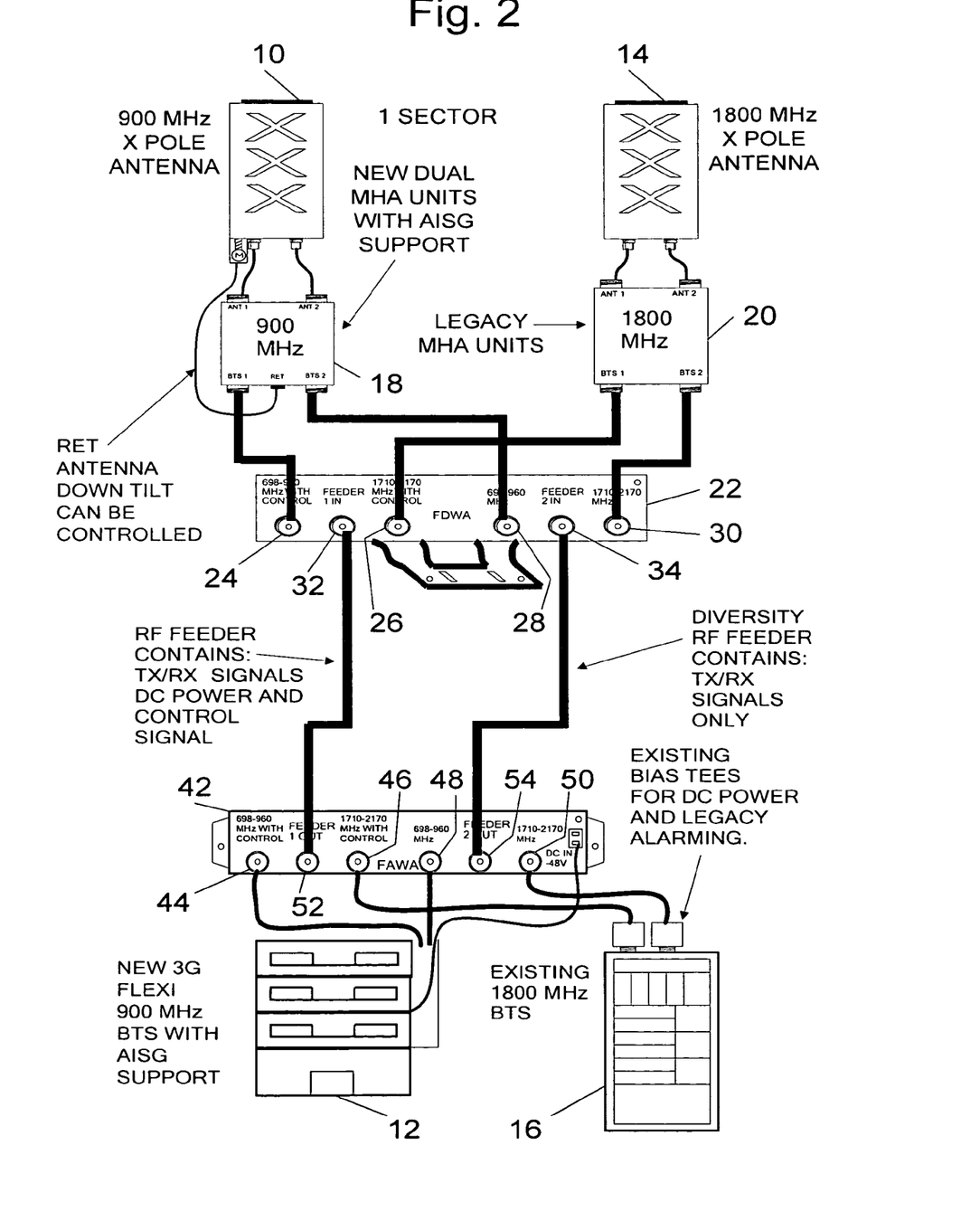
FIG. 2 is a block diagram of an example of a co-site including two antenna/base transceiver station pairs operating on different frequency bands using a filter system according to an embodiment of the present invention.

FIG. 2 is an illustrative example of a co-site that uses two different types of equipment for two systems using different frequency bands for communication. Within the same sector of a co-site, there is a first antenna 10 that corresponds to first base transceiver station (BTS) 12 and a second antenna 14 that corresponds to a second BTS 16. The first antenna 10 is connected to the remainder of the system through a masthead amplifier (MHA) 18 and the second antenna 14 is connected to the remainder of the system through an MHA 20. For example, MHA 18 may be a 900 MHA and MHA 20 may be a 1800 MHz MHA with Antenna Instrumentation Standards Group (AISG) support. Furthermore, the first BTS 12 may be a $3^{rd}$ generation (3G or 3GPP) 900 MHz BTS with AISG support and the second BTS 16 may be a 1800 MHz BTS.

The first and second antennas 10 and 14, along with MHA 18 and MHA 20, are connected to the first and second BTSs 12 and 16 through a pair of filters 22 and 42. Filter 22 includes a low band control port 24, a high band control port 26, a low band diversity port 28, and a high band diversity port 30. Filter 22 also includes a feeder in port 32 and a feeder in port 34. Filter 42 includes a low band control port 44, a high band control port 46, a low band diversity port 48, and a high band diversity port 50. Filter 42 also includes a feeder out port 52 and a feeder out port 54. Filters 22 and 42 are capable of combining signals form two or more separate frequency bands onto one coaxial cable while sacrificing only a minimal loss in power, thereby reducing the need for added cables.

In the example of FIG. 2, the first BTS 12 outputs a signal (transmitting and/or receiving signals) to both the low band control port 44 and the low band diversity port 48. Furthermore, the second BTS 16 outputs a signal (transmitting and/or receiving signals) to both the high band control port 46 and the high band diversity port 50. Filter 42 combines the signal received at the low band control port 44 with the signal received at the high band control port 46 and outputs the combined signals to the feeder in port 32 of filter 22 via the feeder out port 52. Filter 42 also combines the signal received at the low band diversity port 48 with the signal received at the high band diversity port 50 and outputs the combined signals to the feeder in port 34 of filter 22 via the feeder out port 54.

Filter 22 receives the combined signals sent from the first feeder out port 52 at the first feeder in port 32 and splits the combined signals into a signal output to antenna 14 (through MHA 20) via the low band control port 24 and a signal output to antenna 10 (through MHA 18) via the high band control port 26. Filter 22 receives the combined signals sent from the feeder out port 54 at the feeder in port 34 and splits the combined signals into a signal output to antenna 14 via the low band diversity port 28 and a signal output to antenna 10 via the high band diversity port 30.

FIG. 2 is only an illustrative example of a co-site having two different types of equipment for two systems using two different frequency bands for communication. The various embodiments of the present invention are not limited to a co-site including only two systems, as illustrated in FIG. 1, but may include a co-site including any number of different telecommunications systems using any number of different frequency bands for communication.

Figure 3:
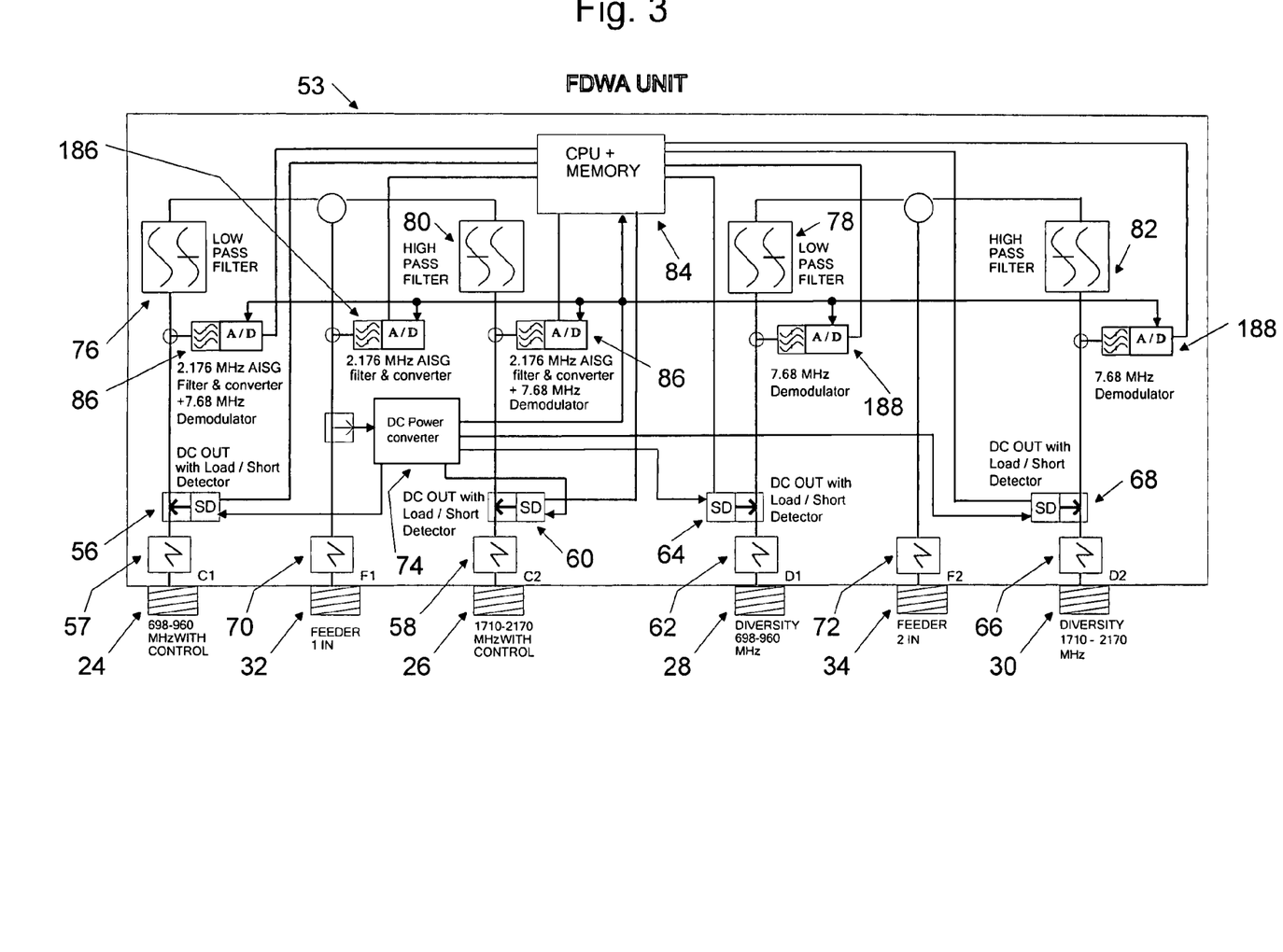
FIG. 3 is a circuit diagram of a FDWA top unit using a filter system according to an embodiment of the present invention.

FIG. 3 shows an example of a top unit (FDWA unit) 53 that incorporates filter 22 shown in FIG. 1. Top unit 53 includes the previously discussed low band control port 24, high band control port 26, low band diversity port 28, high band diversity port 30, feeder in port 32, and feeder in port 34. Low band control port 24 is equipped with a lightening protection circuit 57 and a current monitor/short circuit detector 56, high band control port 26 is equipped with a lightening protection circuit 58 and a current monitor/short circuit detector 60, low band diversity port 28 is equipped with a lightening protection circuit 62 and a current monitor/short circuit detector 64, and high band diversity port 30 is equipped with a lightening protection circuit 66 and a current monitor/short circuit detector 68. Furthermore, feeder in port 32 is equipped with a lightening protection circuit 70 and feeder in port 34 is equipped with a lightening protection circuit 72.

As a non-limiting example, low band control port 24 may be a 698-960 MHz port with control, high band control port 26 may be a 1710-2170 MHz port with control, low band diversity port 28 may be a diversity 698-960 MHz port, and high band diversity port 30 may be a diversity 1710-2170 MHz port. Furthermore, each of the ports 24-30 may be 7/16 RF connectors, with port 24 and port 32 supporting antenna line devices with AISG support and port 28 and port 30 supporting MHAs with current window alarm or 7.68 MHz alarming. Also, feeder in port 32 and feeder in port 34 may be 7/16 RF connectors.

The remainder of top unit 53 includes a DC power converter 74, a pair of low pass filters 76 and 78, a pair of high pass filters 80 and 82, a CPU and memory unit 84, two filter/analog-to-digital converters 86, two filter/analog-to-digital converters 188, and a filter/analog-to-digital converter 186. For example, the filter/analog-to-digital converters 86 could each be a 2.176 MHz AISG filter and bidirectional data converter with additional 7.68 MHz control receive data converter. Furthermore, the filter/analog-to-digital converter 186 could be a 2.176 MHz AISG filter and converter that also provides control between top and bottom filters and bidirectional data conversion. Also, the filter/analog-to-digital converters 188 could each be a 7.68 MHz control receive data converter.

Figure 4:
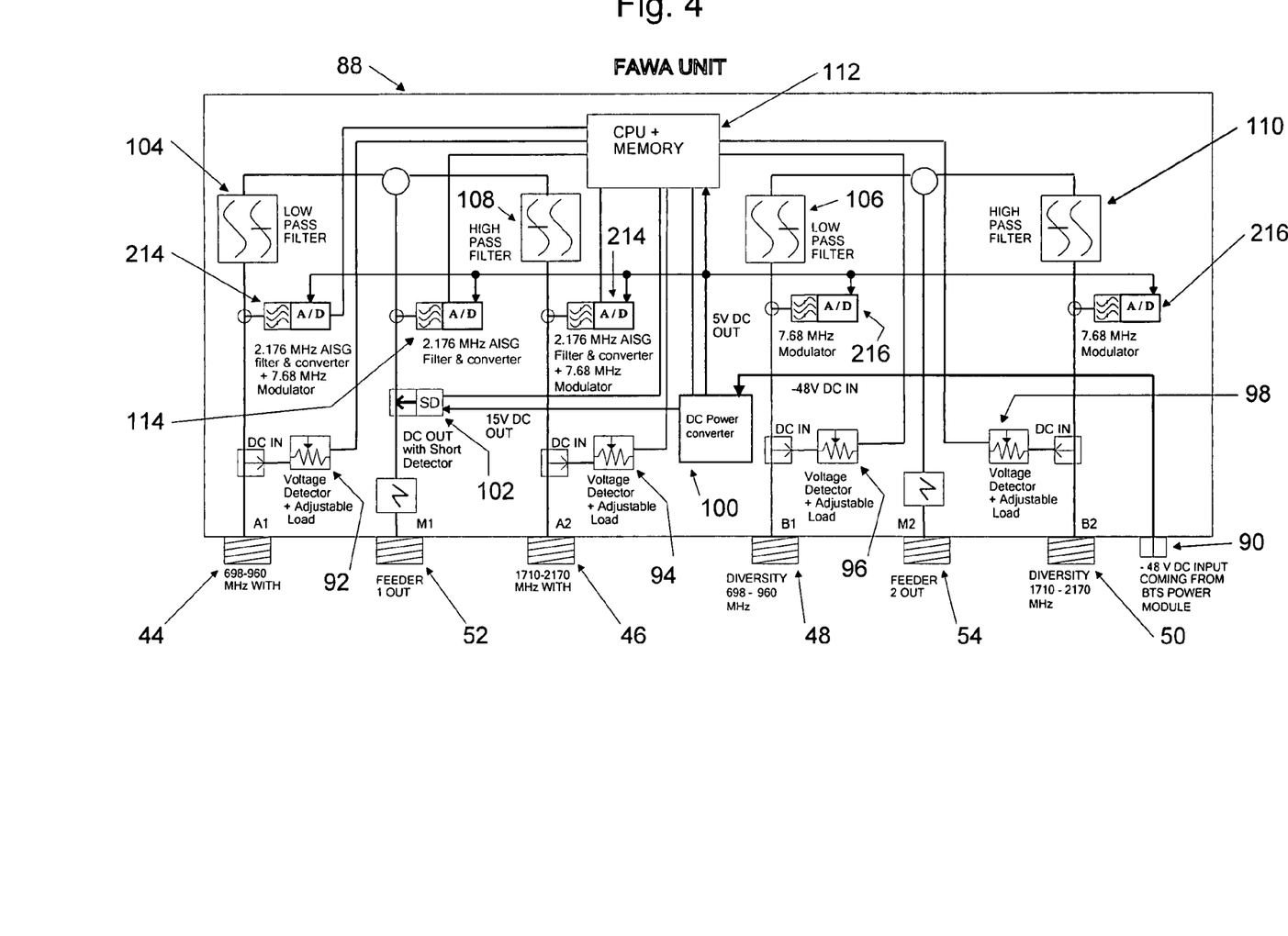
FIG. 4 is a circuit diagram of a FAWA bottom unit using a filter system according to an embodiment of the present invention.

Top unit 53 communicates with the bottom unit (FAWA unit) 88 shown in FIG. 4. Bottom unit 88 incorporates filter 42 shown in FIG. 1 and includes the previously discussed low band control port 44, high band control port 46, low band diversity port 48, high band diversity port 50, feeder out port 52, and feeder out port 54. Bottom unit 88 also includes a DC in port 90. Low band control port 44 is equipped with a voltage detector and adjustable load 92, high band control port 46 is equipped with a voltage detector and adjustable load 94, low band diversity port 48 is equipped with a voltage detector and adjustable load 96, and high band diversity port 50 is equipped with a voltage detector and adjustable load 98.

As a non-limiting example, low band control port 44 may be a 698-960 MHz port with control, high band control port 46 may be a 1710-2170 MHz port with control, low band diversity port 48 may be a diversity 698-960 MHz port, and high band diversity port 50 may be a diversity 1710-2170 MHz port. Furthermore, each of the ports 44-50 may be 7/16 RF connectors, with port 44 and port 46 supporting AISG control signals or 7.68 MHz alarming and port 48 and port 50 supporting MHA current alarms or 7.68 MHz alarming. Also, feeder out port 52 and feeder out port 54 may be 7/16 RF connectors.

The remainder of bottom unit 88 includes a DC power converter 100, a short circuit detector 102, a pair of low pass filters 104 and 106, a pair of high pass filters 108 and 110, a CPU and memory unit 112, two filter/analog-to-digital converters 214, two filter/analog-to-digital converters 216, and a filter/analog-to-digital converter 114. For example, the filter/analog-to-digital converters 114 could each be a 2.176 MHz AISG filter and bidirectional data converter with additional 7.68 MHz control transmit data converter. Furthermore, the filter/analog-to-digital converter 214 could be a 2.176 MHz AISG filter and converter that also provides control between top and bottom filters and bidirectional data conversion. Also, the filter/digital-to-analog converters 216 could each be a 7.68 MHz control transmit data converter.

Filter 42 adjusts an adjustable load on each of the low band control port 44, the high band control port 46, the low band diversity port 48, and the high band diversity port 50 to simulate a current consumption of the low band control port 24, the high band control port 26, the low band diversity port 28, and the high band diversity port 30, respectively. These current consumptions are measured by the current monitors 56, 60, 64, and 68 and sent to the respective ports of filter 42. Thereafter, the adjustable loads 92, 94, 96, and 98 are adjusted to simulate the received current consumptions.

As a non-limiting example, if top unit 53 reads a current consumption of 600 mA on low band control port 24 and a current consumption of 570 mA on high band control port 26, bottom unit 88 will adjust low band control port 44 to 30 Ohms (400 mA at 12 VDC) and high band control port 46 to 30 Ohms (400 mA at 12 VDC). If less than 50 mA are detected, then it is determined that no MHA is present. If between 51 mA and 190 mA are detected, then a 12 dB MHA normal mode is used. If between 230 mA and 290 mA are detected, then a 12 dB MHA alarm mode is used. If between 300 mA and 750 mA are detected, then a 32 dB MHA or 33 dB MHA normal mode is used. If between 800 mA and 900 mA are detected, then a 32 dB MHA or 33 dB MHA alarm mode is used.

As a non-limiting example, if the top unit measures a current of 0-50 mA, then the bottom unit has a load target less than 40 mA. If the top unit measures a current of 50-190 mA, then the bottom unit has a load target of approximately 100 mA. If the top unit measures a current of 191-299 mA, then the bottom unit has a load target of approximately 260 mA. If the top unit measures a current of 300-799 mA, then the bottom unit has a load target of approximately 400 mA. If the top unit measures a current of 800-900 mA, then the bottom unit has a load target of approximately 840 mA. If the top unit measures a current of 900 mA or greater, then the bottom unit has a load target of approximately 1100 mA.

Furthermore, communication between feeder in port 32 and feeder out port 52 and between feeder in port 34 and feeder out port 54 includes a port identifier uniquely identifying a port from which the communication originated and a destination for the communication. For example, a communication between feeder in port 32 and feeder out port 52 may be preceded by a two character code. If high band control port 46 has a character code A2 and bottom unit 88 sends a data signal containing data XXX to top unit 53 via feeder out port 52, the data signal would be sent as A2XXX. When top unit 53 detects A2XXX, then it is known that data XXX is only for high band control port 26.

As a result of the configuration illustrated in FIGS. 2-4, a co-site is established in which no external mounted bias tees are needed near the MHAs. Also, no DC and alarm cable are necessary and no DC blocks are required. Furthermore, since a double filter is provided, there are a reduced number of mounting points and antenna tilt commands can be supported on AISG/3GPP enabled antennas. All of these things result in a reduction in equipments costs, a reduction in installation costs, a reduction in the weight of the needed equipment, and a reduced risk of product failure.

Figure 5:
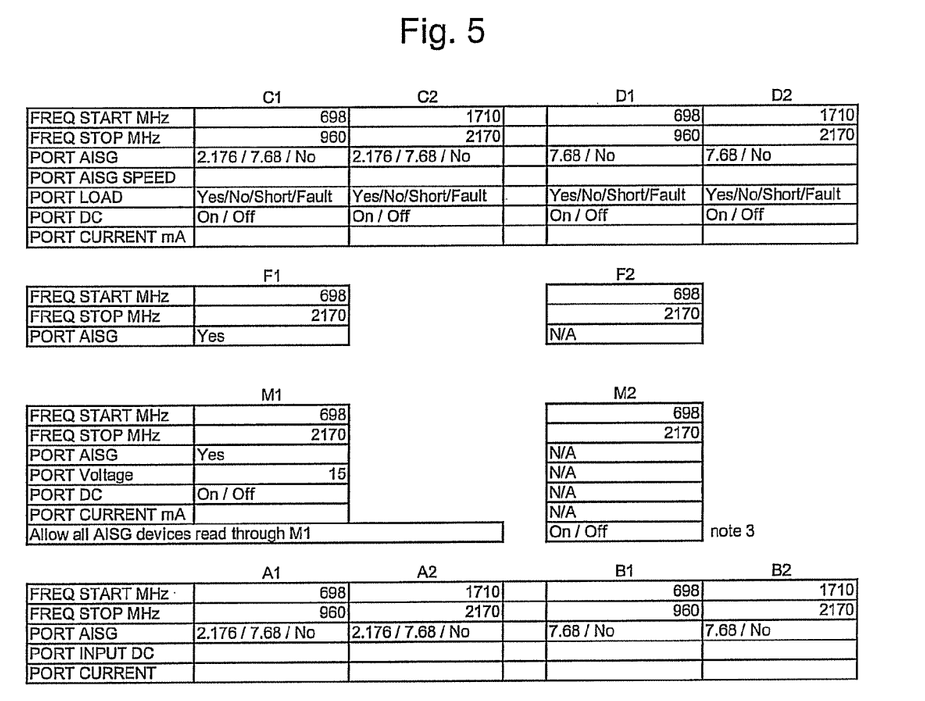
FIG. 5 is a table illustrating the data fields for the FDWA top unit of FIG. 3 and the FAWA bottom unit of FIG. 4 as would be seen by an AISG controller scanning the bottom unit.

FIG. 5 is table illustrating the data fields for the FDWA top unit 53 of FIG. 2 and the FAWA bottom unit 88 of FIG. 3 as would be seen by an AISG controller scanning bottom unit 88.

Figure 6:
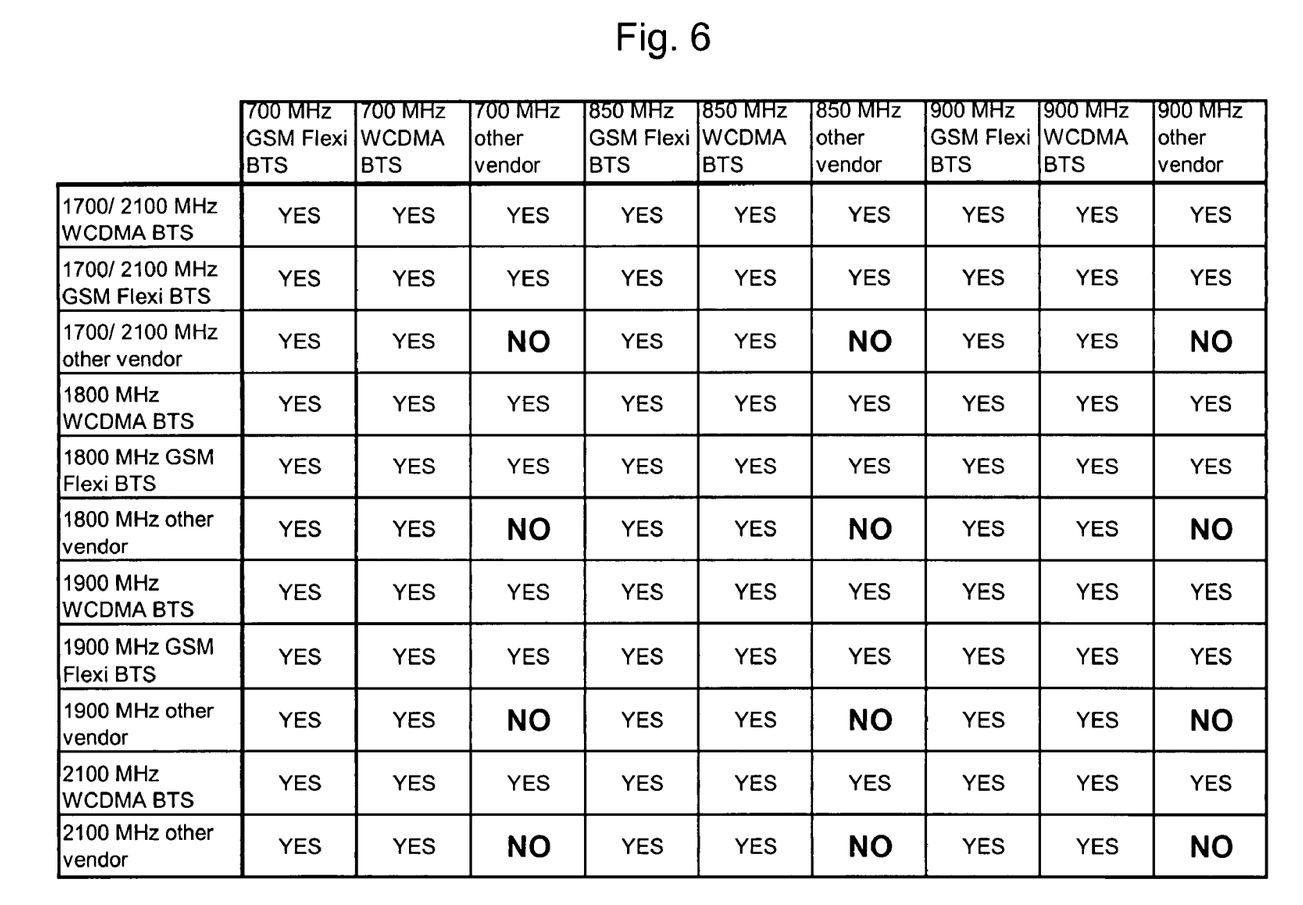
FIG. 6 is a correspondence chart for a co-site using various types of base transceiver stations.

FIG. 6 is a correspondence chart for a co-site using various types of base transceiver stations. Solid blocks represent a pair of BTSs that can utilize the filter described above in a co-site containing those two BTSs. An X represents a BTS pair that may not be able to use the filter described above. The AISG standard (as also adopted in the 3GPP standard) is a standard that includes DC power requirements, feature set and commands, and operating requirements and may be adapted into the various embodiments described above.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004). It would be appreciated by those skilled in the art that changes may be made in the described embodiments without departing from the principles and spirit of the invention, the scope of which is defined in the claims and their equivalents.

What is claimed is:

1. A filter system for use in a co-site including at least two antenna/base transceiver station pairs operating on different frequency bands, the filter system comprising:
   first and second filters, each including low and high band control ports and low and high band diversity ports, the second filter adjusting an adjustable load on each of the low and high band control ports and low and high band diversity ports of the second filter to simulate current consumption of the low and high band control ports and low and high band diversity ports of the first filter, respectively.

2. The filter system as claimed in claim 1,
   wherein the first filter includes first and second feeder in ports, and
   wherein the second filter includes a first feeder out port that communicates with the first feeder in port and a second feeder out port that communicates with the second feeder in port.

3. The filter system as claimed in claim 2,
   wherein the second filter combines a low band control signal received from a first base transceiver station at the low band control port with a high band control signal received from a second base transceiver station at the high band control port and outputs a combined control signal to the first feeder in port via the first feeder out port, and
   wherein the second filter combines a low band diversity signal received from the first base transceiver station at the low band diversity port with a high band diversity signal received from the second base transceiver station at the high band diversity port and outputs a combined diversity signal to the second feeder in port via the second feeder out port.

4. The filter system as claimed in claim 3,
   wherein the first filter receives the combined control signal sent from the first feeder out port at the first feeder in port and splits the combined control signal into a low band control output signal to a first antenna via the low band control port and a high band control output signal to a second antenna via the high band control port, and
   wherein the first filter receives the combined diversity signal sent from the second feeder out port at the second feeder in port and splits the combined diversity signal into a low band diversity output signal to the first antenna via the low band diversity port and a high band diversity output signal to the second antenna via the high band diversity port.

5. The filter system as claimed in claim 4, wherein the first filter is provided in an FDGA top unit adjacent to the first and second antennas and the second filter is provided in an FCGA bottom unit adjacent to the first and second base transceiver stations.

6. The filter system as claimed in claim 2,
wherein each of the low and high band control ports and low and high band diversity ports of the first filter includes a current monitor and a short circuit detector,
wherein each of the low and high band control ports and low and high band diversity ports of the second filter includes a voltage detector and an adjustable load,
wherein the first filter outputs to the second filter a current consumption signal representing current consumption measured by the current monitor at each of the low and high band control ports and low and high band diversity ports of the first filter.

7. The filter system as claimed in claim 2, wherein communication between the first feeder in port and the first feeder out port or between the second feeder in port and the second feeder out port includes a port identifier uniquely identifying a port from which the communication originated.

8. A control method for a filter system used in a co-site that includes at least two antenna/base transceiver station pairs operating on different frequency bands, the filter system including first and second filters, each including low and high band control ports and low and high band diversity ports, the method comprising:
measuring a current consumption at each of the low and high band control ports and the low and high band diversity ports of the first filter;
outputting the measured current consumption at each of the low and high band control ports and the low and high band diversity ports of the first filter to the low and high band control ports and the low and high band diversity ports of the second filter, respectively; and
adjusting an adjustable load on each of the low and high band control ports and the low and high band diversity ports of the second filter to simulate the respective measured current consumptions.

9. The control method as claimed in claim 8, further comprising:
combining a signal received from a first base transceiver station at the low band control port of the second filter with a signal received from a second base transceiver station at the high band control port of the second filter and outputting the combined signals to a first feeder in port of the first filter; and
combining a signal received from the first base transceiver station at the low band diversity port of the second filter with a signal received from the second base transceiver station at the high band diversity port of the second filter and outputting the combined signals to a second feeder in port of the first filter.

10. The control method as claimed in claim 9, further comprising:
splitting the combined signals received at the first feeder in port into a signal output to a first antenna via the low band control port and a signal output to a second antenna via the high band control port; and
splits the combined signals received at the second feeder in port into a signal output to the first antenna via the low band diversity port and a signal output to the second antenna via the high band diversity port.

* * * * *